*Thompson & Herrick.*
*Earth Auger.*
Nº 71,086.   Patented Nov. 19, 1867.
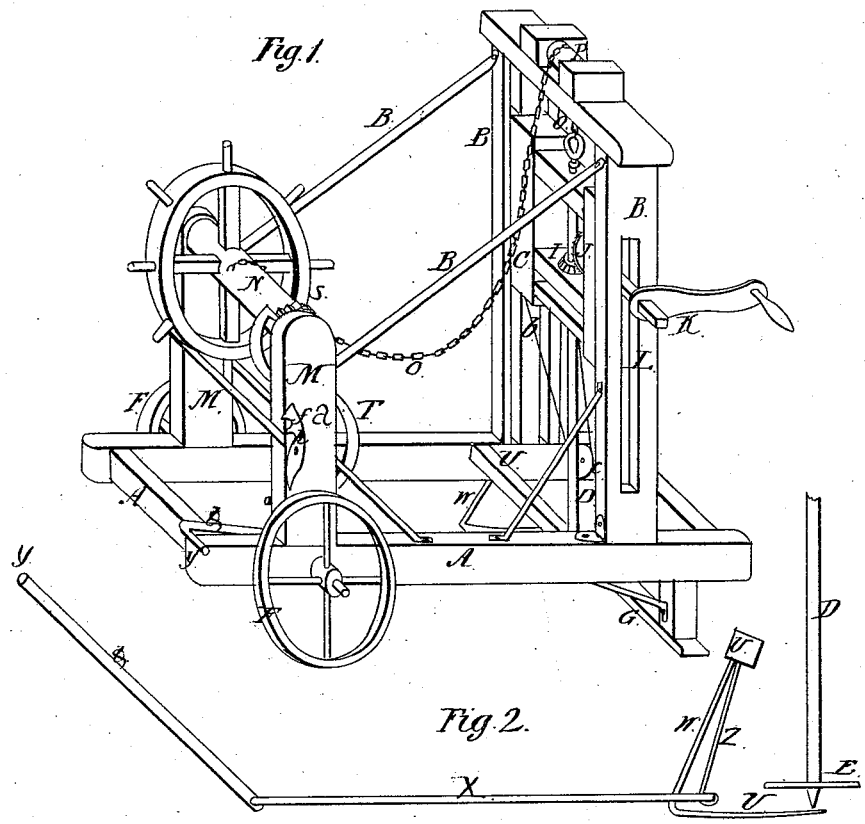
Witnesses:
David E. Richmond
C. H. Ripley
Inventors:
Joseph Thompson
B. B. Herrick
By their attorney
G. L. Chapin

United States Patent Office.

JOSEPH THOMPSON AND B. B. HERRICK, OF EDGEWOOD, ILLINOIS.

*Letters Patent No. 71,086, dated November 19, 1867.*

IMPROVED MACHINE FOR DIGGING POST-HOLES.

*The Schedule referred to in these Letters Patent and making part of the same.*

TO ALL WHOM IT MAY CONCERN:

Be it known that we, J. THOMPSON and B. B. HERRICK, of Edgewood, in the county of Effingham, in the State of Illinois, have invented an Improved Machine for Digging Post-Holes; and we do hereby declare that the following is a full and exact description thereof, reference being had to the accompanying drawings, and to the letters of reference marked thereon, making a part of this specification, in which—

Figure 1 is a representation of our invention.

Figure 2, a longitudinal elevation of the device which retains the dirt after having been elevated by the auger.

The nature of our invention consists in the use of a substantial frame, supported upon wheels, to which are attached standards for guiding a post-hole auger, and in the use of such mechanical appliances as will turn, raise, and lower the auger, suitably for boring a post-hole; and, further, in the use of a shovel, operated by levers in such a manner as to pass under the dirt raised by the auger, and prevent it from falling into the hole.

In order to give a correct understanding of our invention, we have marked corresponding parts, and will now give a detailed description.

A A represent a substantial frame, resting upon wheels F F and foot G, for the convenience of transportation, and holding the machine in position when the post-hole is being made. Standards B B are secured to frame A A, and extended high enough for the auger-sash C (to which the auger is attached) to raise and lower, according to the depth of hole to be bored. A pinion, I, is attached to the shank D of auger E, and is made to turn said shank by means of a bevel pinion, J, attached to a crank-shaft, K, made to rise and fall in a slot, L, as the auger E is made to enter or rise out of the ground. This arrangement is very similar to the common boring machine for making holes in wood, and therefore is not considered new. Standards M M are attached to frame A A, and are made to support a capstan, N, used in combination with a chain, O O, and pulley, P, in raising auger E out of the ground at such times as the dirt is to be raised out of the hole to be dug. A common ratchet, S, is attached to the drum of capstan N, and made to hold the auger in the required position by means of a self-balancing pawl, T, hung to the inside of one of the posts M.

The arrangement for preventing the dirt from entering the post-hole, after having been drawn out by the auger E, consists of a shovel, U, fig. 2, attached to levers W, figs. 1 and 2, which are put through a roller, V, figs. 1 and 2, and made to force said shovel U under the dirt as soon as removed from the post-hole, and deposit it at such a point as most convenient. A rod, X, is attached to a lever, Z, (fixed to roller V,) and used to operate shovel U by means of a crank, y, and a catch, a, attached to standard M, by which means said shovel U can be held in position for transportation, when crank y is adjusted in notch f of catch a, and kept from passing under the shovel by putting the crank in notch h; and at the same time that the notch f is used, that part of the crank shown at x will strike against the end of balancing-pawl T, and cause it to fall into ratchet S, and hold the auger out of the ground, the position of crank y, when shovel U is forced under auger E, being clearly shown at figs. 1 and 2. A rope, d, fig. 1, is attached to the under side of sash C, and is made to pass over pulley e, or otherwise, as most convenient, for the attachment of a weight for forcing the auger E into the ground, or regulating the feed.

The operation is very simple, and as follows: The frame A A can be moved, by horse-power or otherwise, to such a place as will bring the auger E over the spot where the hole is to be bored, after which the crank y should be put in notch f, which will allow auger E to rest on the ground. The crank K can then be turned until a hole has been made the required depth, at which time the capstan N can be turned, and draw the auger out of the ground, and crank y lowered, as at figs. 1, 2, so as to prevent the dirt from falling into the hole.

Having thus fully described our device, what we claim, and desire to secure by Letters Patent, is—

1. The shovel U, hung to roller V by means of levers W, and operated by means of lever Z, rod X, and crank y, for the purpose of catching the dirt drawn out by auger E, substantially as herein specified.

2. The combination of the standards B, having a slot, L, with sash C, shovel U, and auger E, arranged and operating as herein described.

3. The combination of the capstan N, pawl T, sash C, standards B, shovel E, levers W Z, rod X, and crank y, substantially as and for the purpose set forth.

JOSEPH THOMPSON,
B. B. HERRICK.

Witnesses:
DAVID E. RICHMOND,
O. H. REPLIZ.